(12) United States Patent
Uchida et al.

(10) Patent No.: US 6,495,235 B2
(45) Date of Patent: Dec. 17, 2002

(54) OPTICAL DISK, SUBSTRATE OF THE SAME, AND MOLD FOR FORMING THE SUBSTRATE

(75) Inventors: Kiyoshi Uchida, Nara (JP); Akira Kurozuka, Osaka (JP); Tomio Yamamoto, Hyogo (JP); Eiichi Hanakawa, Kyoto (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 78 days.

(21) Appl. No.: 09/804,834

(22) Filed: Mar. 13, 2001

(65) Prior Publication Data

US 2001/0024708 A1 Sep. 27, 2001

(30) Foreign Application Priority Data

Mar. 24, 2000 (JP) .......................... 2000-085131

(51) Int. Cl.$^7$ ................................. B32B 3/02
(52) U.S. Cl. ....................... 428/64.1; 369/282
(58) Field of Search ............... 428/64.1, 64.4, 428/913; 430/270.11, 495.1, 945; 369/282, 290

(56) References Cited

U.S. PATENT DOCUMENTS

| | | | |
|---|---|---|---|
| 4,553,232 A | * 11/1985 | Civington | ............. 369/287 |
| 5,326,240 A | 7/1994 | Kudo et al. | |
| 5,476,700 A | * 12/1995 | Asai | ............. 428/66.6 |
| 5,541,910 A | * 7/1996 | Tanaka | ............. 369/290 |
| 6,137,762 A | * 10/2000 | Uwabo | ............. 369/77.2 |
| 6,205,111 B1 | * 3/2001 | Hayakawa | ............. 369/270 |
| 6,411,594 B1 | * 6/2002 | Yamazaki | ............. 369/282 |

FOREIGN PATENT DOCUMENTS

| JP | 5-89529 | 4/1993 |
|---|---|---|
| JP | 5-293869 | 11/1993 |
| JP | 5-303768 | 11/1993 |

* cited by examiner

*Primary Examiner*—Elizabeth Mulvaney
(74) *Attorney, Agent, or Firm*—Merchant & Gould, P.C.

(57) ABSTRACT

A clamp plate retaining surface, a handling surface positioned outside the outer circumference of the clamp plate retaining surface, and an information surface outside the outer circumference of the handling surface are provided in a substrate. The handling surface is formed to be a slope with its outer circumferential side being inclined downward with respect to the information surface. The resin forming the inner circumferential side end of the handling surface is melted and deformed to form a projection part, so that a clamp plate can be retained. Since the top part of the slope is deformed, a large projection part can be formed. As a result, a thin small-diameter optical disk and substrate can be obtained.

23 Claims, 13 Drawing Sheets

OPTICAL DISK, SUBSTRATE OF THE SAME, AND MOLD FOR FORMING THE SUBSTRATE

BACKGROUND OF THE INVENTION

1. Field of the Invention

The present invention relates generally to an optical disk used for information recording or reproduction, its substrate, and a mold for forming the substrate.

2. Related Background Art

Conventionally, an optical disk and its substrate have been proposed in a minidisk form disclosed in JP 5(1993)-303768 A.

FIG. 11 shows a schematic sectional view of a conventional optical disk. In FIG. 11, numeral 101 indicates an optical disk substrate, numeral 102 a handling surface, numeral 103 an information surface, numeral 104 a clamp plate retaining surface, numeral 106 a clamp plate, numeral 107 a groove, numeral 108 an information recording layer, numeral 109 a protective coating, and numeral 120 a rotation central axis. The functions of the optical disk configured as described above and its substrate are described as follows.

On the information surface 103 formed on one principal plane of the optically transparent disc-like substrate 101 made of polycarbonate, acrylic resin, or the like, a signal recording/reproduction layer or a reflection film is formed as the information recording layer 108 and the protective coating 109 is formed thereon. Thus, the optical disk is configured. The disc-like clamp plate 106 formed of an iron plate or magnetic stainless steel is attached to the clamp plate retaining surface 104 around the center of the substrate 101. The clamp plate 106 is attracted magnetically to a disk table fixed to the tip of a spindle axis of a recording/reproducing device. Thus, the substrate 101 is rotated together with the disk table.

For instance, JP 5(1993)-89529 A describes a welding method using ultrasonic waves and an adhesion method using an ultraviolet curable resin as methods of holding the clamp plate 106 to the substrate 101.

The welding method using ultrasonic waves is carried out as follows. As shown in FIG. 11, the clamp plate 106 is placed on the clamp plate retaining surface 104. Then, a ring-like contact face of an ultrasonic horn tip is pressed against an inner circumferential side end portion of the handling surface 102 with a predetermined force. In this state, ultrasonic vibration is applied, so that the resin forming the portion against which the contact face has been pressed (hereinafter referred to as the "pressed portion") is melted. The pressing force of the ultrasonic horn allows the resin thus melted to deform and the pressed portion to be displaced downward. In addition, the melted resin projects from a wall surface extending between the clamp plate retaining surface 104 and the handling surface 102 and thus a projection part 110 as shown in FIG. 12 is formed. In FIG. 12, numeral 112 indicates a displaced surface formed by the displacement of part of the handling surface 102 on its inner circumferential side by the contact with the contact face of the ultrasonic horn. In this case, the projection amount of the projection part 110 toward the center corresponds to a displacement amount of the displaced surface 112 with respect to the handling surface 102. As a result, an outer circumferential side flat portion (hereinafter referred to as an "outer flat portion") 106a around the outer circumference of the clamp plate 106 is sandwiched between the clamp plate retaining surface 104 and the projection part 110. Therefore, the clamp plate 106 is retained so as not to come off the clamp plate retaining surface 104.

The adhesion method using an ultraviolet curable resin is carried out as follows. Initially, an ultraviolet curable resin is applied between the clamp plate retaining surface 104 and the outer flat portion 106a around the outer circumference of the clamp plate 106. Then, the ultraviolet curable resin is irradiated with ultraviolet rays to be cured. Thus, the clamp plate retaining surface 104 and the clamp plate 106 are bonded and fixed.

The substrate 101 is manufactured by injection molding. The handling surface 102 functions as a suction face to be subjected to the suction of a vacuum suction pad attached to the end of a robot arm when the substrate 101 molded by injection molding is taken out from the mold using the robot arm. The inner circumferential side end of the handling surface 102 is defined by the outer circumferential side end of the clamp plate retaining surface 104 and the outer circumferential side end of the handling surface 102 is defined by the inner circumferential side end of the groove 107. The groove 107 is formed as the reflection of the shape of a mold part required for holding a stamper incorporated into the mold. The inner circumferential side end of the information surface 103 (the inner circumferential side end in an area where grooves or pits are formed) is positioned at a predetermined distance from the outer circumferential side end of the groove 107.

In the optical disk and its substrate, it is required to reduce the diameter and thickness of the disk so that the optical disk can be applied to portable equipment.

However, in the optical disk and its substrate with the clamp plate 106 sandwiched between the clamp plate retaining surface 104 and the projection part 110 as shown in FIG. 12, there has been the following problem in thickness reduction. In order to reduce the thickness of the substrate 101, it is necessary to shorten the distance in the thickness direction between the handling surface 102 and the clamp plate retaining surface 104. In FIG. 12, therefore, the displacement amount in the thickness direction of the displaced surface 112 with respect to the handling surface 102 is reduced. Thus, the projection amount of the projection part 110 is reduced. As a result, the reliability in retaining the clamp plate 106 decreases.

In order to solve the above mentioned problem, the following method might be considered. That is, a protrusion 114 is formed along the inner circumferential side end of the handling surface 102 as shown in FIG. 13, and then while the contact face of an ultrasonic horn is pressed against the protrusion 114 to suppress the occurrence of the difference in level between the handling surface 102 and the displaced surface 112, the projection amount of the projection part 110 toward the center is increased. However, in this method, due to the formation of the protrusion 114, the inner circumferential side end of the handling surface 102 is displaced radially outward. In order to take out the substrate 101 from the mold used for injection molding, it is necessary to form the handling surface 102 with a larger area than a predetermined area. Therefore, the outer circumferential side end of the handling surface 102 is required to be shifted radially outward. Accordingly, the inner and outer circumferential side ends of the groove 107 and the inner circumferential side end of the information surface 103 also are required to be shifted sequentially to the radially outer side. Therefore, in order to secure the same recording capacity, the outer diameter of the optical disk increases, which has been a problem.

On the other hand, in an optical disk and its substrate in which the clamp plate 106 is bonded and fixed to the clamp plate retaining surface 104 with an ultraviolet curable resin, the above-mentioned problem is not caused when the size and thickness of the disk are intended to be reduced. However, after being applied, the ultraviolet curable resin is solidified gradually with the passage of time. For instance, therefore, in the case where the environmental temperature varies, since the clamp plate 106 and the substrate 101 are different in material and thus in thermal expansion coefficient, the substrate 101 is distorted, which may cause noise generation.

SUMMARY OF THE INVENTION

The present invention intended to solve the above-mentioned problem. It is an object of the present invention to provide an optical disk and its substrate whose sizes and thicknesses can be reduced and to provide a mold for forming the substrate. In addition, the present invention is intended to provide an optical disk in which no distortion remains in its substrate, and to provide the substrate for the optical disk.

In order to achieve the above-mentioned objects, the present invention employs the following configurations.

A first optical disk substrate of the present invention includes at least a clamp plate, a clamp plate retaining surface, a handling surface, and an information surface. The clamp plate retaining surface retains the clamp plate with an outer circumferential side flat portion of the clamp plate being in contact therewith. The handling surface is provided outside the outer circumference of the clamp plate retaining surface. The information surface is provided outside the outer circumference of the handling surface. At least part of the handling surface is inclined with respect to the information surface.

According to the first optical disk substrate, the top part of a slope of the handling surface is melted to be deformed, so that the clamp plate can be retained. As a result, it is possible to reduce the thickness of the optical disk and substrate with the clamp plate attached thereto. In addition, since the inner circumferential side end of the information surface can be positioned to be closer to the rotation central axis, an optical disk and a substrate with smaller outer diameters can be obtained.

In the first optical disk substrate, preferably, the substrate has a thickness in a range of 0.5 mm to 0.7 mm in an area where the information surface is formed. When the thickness is below the range, the mechanical strength of the substrate decreases and thus deformation of the substrate or surface wobbling during rotation may occur. On the other hand, the thickness exceeding the range results in the reduction in the working distance (a distance between an objective lens and the optical disk surface) with respect to an objective lens with a high numerical aperture of at least 0.6.

In the first optical disk substrate, it is preferable that an inclination angle of the handling surface with respect to the information surface is in a range of 2° to 10°, further preferably 3° to 6°. When the inclination angle is below the range, the inner circumferential side end of the information surface is positioned inevitably at a longer distance from the rotation central axis. Therefore, the recording capacity of the optical disk decreases or the disk diameter increases. The inclination angle exceeding the range causes the substrate to be partially thinner and thus the mechanical strength of the substrate decreases. In addition, malfunction of a suction pad in sticking to the handling surface may occur.

In the first optical disk substrate, it also is preferable that the handling surface has a radial width in a range of 1.8 mm to 2.5 mm. When the radial width of the handling surface is below the range, malfunction of the suction pad in sticking to the handling surface may occur. On the other hand, when the width exceeds the range, the inner circumferential side end of the information surface is positioned at a longer distance from the rotation central axis. Therefore, the recording capacity of the optical disk decreases or the disk diameter increases.

In the first optical disk substrate, preferably, the radial distance between an outer circumferential side end of the handling surface and the inner circumferential side end of the information surface is in a range of 2.0 to 4.0 mm. When the distance is below the range, the position to which a slider of a magnetic head can move on the inner circumferential side of the optical disk is limited and therefore the recording capacity is limited. On the other hand, when the distance exceeds the range, the inner circumferential side end of the information surface is positioned at a longer distance from the rotation central axis. Therefore, the recording capacity of the optical disk decreases or the disk diameter increases.

Furthermore, in the first optical disk substrate, it is preferable that a distance between a supposed first center plane and a supposed second center plane does not exceed 0.3 mm. The supposed first center plane is at equal distances from a surface of the clamp plate furthest from the clamp plate retaining surface and a back face of the optical disk substrate in an area where the clamp plate retaining surface is formed. The supposed second center plane is at equal distances from the information surface and a back face of the optical disk substrate in an area where the information surface is formed. When the distance between the supposed first and second center planes exceeds the range, the thicknesses of the optical disk and the substrate increase, which thus makes it difficult to reduce the thickness of a driving unit as compared to that of a conventional unit.

In the first optical disk substrate, preferably, a distance between the information surface and a plane including a circle defined by the deepest portion of the handling surface does not exceed 0.25 mm. When the distance exceeds 0.25 mm, the thickness of the substrate is reduced partially, and thus the mechanical strength of the substrate decreases.

In the first optical disk substrate, it also is preferable that an outer circumferential side end of the handling surface is lower than the information surface. This allows a stamper for molding the information surface to be held by its inner circumferential end.

Preferably, the first optical disk substrate further includes a projection part projecting toward the center formed inside an inner circumferential side end of the handling surface, with an upper face of the projection part being lower than the inner circumferential side end of the handling surface, and the clamp plate is limited in position in its thickness direction by the projection part and the clamp plate retaining surface. According to this configuration, the resin forming the inner circumferential side end of the handling surface is melted to form the projection part and thus the clamp plate can be retained. Therefore, an optical disk and a substrate can be provided in which distortion tends not to be caused by temperature variation.

In the first optical disk substrate, it is preferable that in the clamp plate, its outer circumferential side flat portion is thinner than its inner circumferential side flat portion. When the clamp plate is attached to the substrate with its thinner outer circumferential side flat portion being sandwiched between the clamp plate retaining surface and the projection part, the thicknesses of the optical disk and the substrate can be reduced. In addition, the inner circumferential side flat portion is formed to be relatively thick, so that a required magnetic attraction can be secured.

In this case, the inner circumferential side flat portion of the clamp plate may be formed of a plurality of stacked members. This allows the clamp plate having different thicknesses depending on the position to be manufactured easily at low cost.

A second optical disk substrate of the present invention includes at least a clamp plate, a clamp plate retaining surface, a handling surface, and an information surface. The clamp plate retaining surface retains the clamp plate with an outer circumferential side flat portion of the clamp plate being in contact therewith. The handling surface is provided outside the outer circumference of the clamp plate retaining surface. The information surface is provided outside the outer circumference of the handling surface. In the clamp plate, the outer circumferential side flat portion is thinner than its inner circumferential side flat portion.

According to such a second optical disk substrate, the clamp plate is attached to the substrate with the thinner outer circumferential side flat portion being held, so that the thicknesses of the optical disk and the substrate can be reduced. In addition, the inner circumferential side flat portion is formed to be relatively thick, so that a required magnetic attraction can be secured.

In the second optical disk substrate, the inner circumferential side flat portion of the clamp plate may be formed of a plurality of stacked members. This allows the clamp plate having different thicknesses depending on the position to be manufactured easily at low cost.

A third optical disk substrate of the present invention includes at least a clamp plate, a clamp plate retaining surface, a handling surface, and an information surface. The clamp plate retaining surface retains the clamp plate with an outer circumferential side flat portion of the clamp plate being in contact therewith. The handling surface is provided outside the outer circumference of the clamp plate retaining surface. The information surface is provided outside the outer circumference of the handling surface. The clamp plate retaining surface and the information surface are different in level. The thickness of the substrate in an area where the clamp plate retaining surface is formed is in a range of 0.75 to 1.25 times the thickness of the substrate in an area where the information surface is formed. The thickness of the substrate in an area where the handling surface is formed is in a range of 0.75 to 1.25 times the thickness of the substrate in the area where the information surface is formed. The distance between a wall surface extending between the clamp plate retaining surface and the handling surface and a wall surface extending between a back face of the clamp plate retaining surface and a back face of the information surface is in a range of 0.75 to 1.25 times the thickness of the substrate in the area where the information surface is formed.

According to such a third optical disk substrate, an optical disk and a substrate can be obtained in which mechanical and optical distortions hardly occur.

In the third optical disk substrate, it is preferable that at least part of the handling surface is inclined with respect to the information surface. According to this configuration, the top part of the slope of the handling surface is melted to be deformed, so that the clamp plate can be retained. As a result, the thicknesses of the optical disk and the substrate to which the clamp plate is attached can be reduced. In addition, the inner circumferential side end of the information surface can be positioned closer to the rotation central axis. Therefore, a small-diameter optical disk and substrate can be obtained.

An optical disk of the present invention includes at least the first, second, or third optical disk substrate and an information recording layer, and at least the information recording layer is formed on the information surface of the optical disk substrate.

Preferably, the optical disk further includes grooves along recording tracks or grooves forming recording tracks at the information surface, and a ratio of a quantity of light reflected from the grooves to a quantity of light reflected from a flat portion other than the portion where the grooves are formed is in a range of 0.3 to 0.8 when the information recording layer is irradiated with a beam. When the ratio exceeds the range, a sufficient rate of signal modulation in the grooves cannot be obtained. On the other hand, when the ratio is below the range, signals cannot be secured sufficiently due to a small quantity of light reflected from the grooves.

In the above, preferably, the beam with which the information recording layer is irradiated has the same wavelength as that of a beam used for recording and/or reproduction. This is intended to allow the condition described above to correspond to actual conditions.

A mold of the present invention includes at least a disc-like fixed-side main body with a flat principal plane, an inner stamper hold fitted inside the fixed-side main body, a fixed-side bushing fitted inside the inner stamper hold, a disc-like movable-side main body installed in a position substantially opposing the fixed-side main body at a predetermined space, a movable-side bushing, and a floating punch. The movable-side bushing is fitted inside the movable-side main body and is installed in a position substantially opposing the inner stamper hold at a predetermined space. The floating punch is fitted inside the movable-side bushing and is installed in a position substantially opposing the fixed-side bushing at a predetermined space. A surface of the inner stamper hold opposing the movable-side bushing is inclined with respect to the principal plane of the fixed-side main body. A surface of the fixed-side bushing opposing the floating punch is positioned on a side of the floating punch with respect to the principal plane of the fixed-side main body.

Since the surface of the inner stamper hold opposing the movable-side bushing is inclined, an optical disk substrate with a slope corresponding to the inclination can be formed. In addition, since the surface of the fixed-side bushing is positioned on the side of the floating punch, an optical disk substrate with a difference in level adapted to receive and retain a clamp plate can be formed. The top part of the slope of the optical disk substrate is melted to be deformed, so that the clamp plate can be retained. As a result, a thin and small-diameter optical disk and substrate can be obtained.

In the mold described above, it is preferable that the surface of the inner stamper hold opposing the movable-side bushing is a slope inclined from its inner circumferential side to its outer circumferential side toward the movable-side bushing. According to this configuration, an optical disk substrate can be formed which has a slope with its inner circumferential side higher. Therefore, the inner circumferential side end positioned at a higher level is melted to be deformed, so that the clamp plate can be retained.

Preferably, the above-mentioned mold further includes a disc-like stamper attached to the principal plane of the fixed-side main body, an outer circumferential side end of the surface of the inner stamper hold opposing the movable-side bushing being positioned on a side of the movable-side bushing with respect to a surface of the stamper, and an inner circumferential side end of the surface of the inner stamper hold opposing the movable-side bushing being positioned further apart from the movable-side bushing than the outer circumferential side end is. According to this configuration, the stamper can be held by the outer circumferential side end of the inner stamper hold.

BRIEF DESCRIPTION OF THE DRAWINGS

FIG. 5A is its plan view and FIG. 5B its sectional view.

DETAILED DESCRIPTION OF THE INVENTION

Embodiments of the present invention are described with reference to FIGS. 1 to 10 as follows.

First Embodiment

Figure 1:
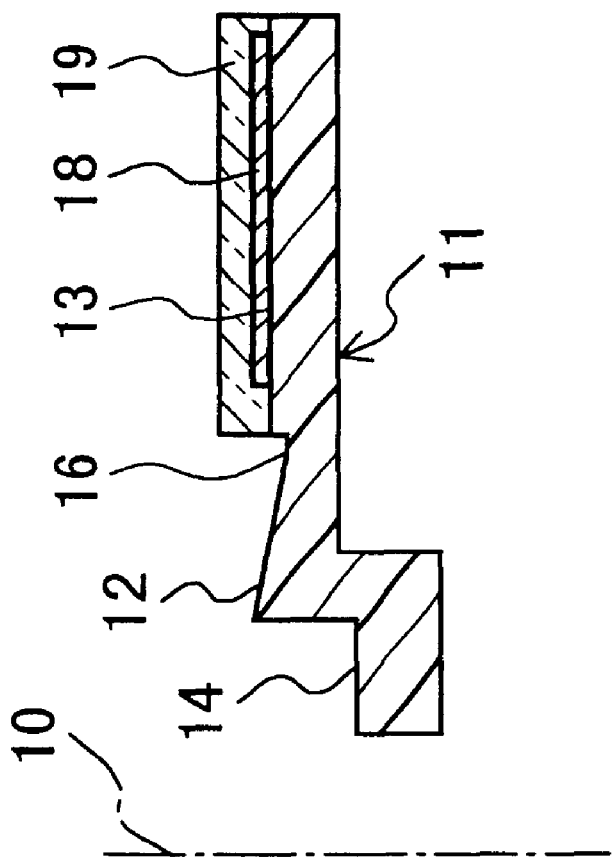
FIG. 1 is a schematic sectional view showing a state of an optical disk according to a first embodiment of the present invention before a clamp plate is attached thereto.

FIG. 1 is a sectional view of an optical disk according to a first embodiment of the present invention, taken in a plane including a rotation central axis and in the thickness direction. FIG.1 shows the optical disk in a state before the clamping plate described later is attached thereto. In FIG. 1, numeral 11 indicates an optical disk substrate, numeral 12 a handling surface, numeral 13 an information surface, numeral 14 a clamp plate retaining surface, numeral 16 a recessed portion, numeral 18 an information recording layer, numeral 19 a protective coating, and numeral 10 a rotation central axis. With respect to the substrate of the optical disk configured as described above, its function and a method of manufacturing it are described as follows.

The substrate 11 is an optically transparent disc formed of polycarbonate, acrylic resin, or the like and is manufactured by injection molding in general. The information surface 13 at which grooves and/or pits are formed is provided on one of principal planes of the substrate 11. The grooves are formed along recording tracks or are formed to form the recording tracks. In addition, the pits are formed along the recording tracks. Preferably, the substrate 11 has a thickness in the range of 0.5 to 0.7 mm in an area where the information surface 13 is formed.

The information recording layer 18 and the protective coating 19 are formed sequentially on the information surface 13 of the substrate 11 and thus the optical disk is obtained.

In the case of an optical disk used exclusively for reproduction, a reflection film formed by deposition of Al, Au, Ag, or alloys thereof by means of, for example, sputtering or the like can be used as the information recording layer 18. In the case of an optical disk with respect to which recording and reproduction can be carried out, a signal recording/reproduction layer obtained by formation of a magneto-optical recording film or a phase-change recording film obtained by means of sputtering or the like or a signal recording/reproduction layer obtained by formation of a dye film by means of spin coating or the like can be used as the information recording layer 18.

When the surface of the information recording layer 18 is irradiated with a beam having a wavelength used for recording or reproduction with respect to the optical disk, it is preferable that the ratio of the quantity of light reflected from the grooves formed at the information surface 13 to that of light reflected from a flat surface (a flat area where the grooves and pits are not formed) is in the range of 0.3 to 0.8.

Figure 2:
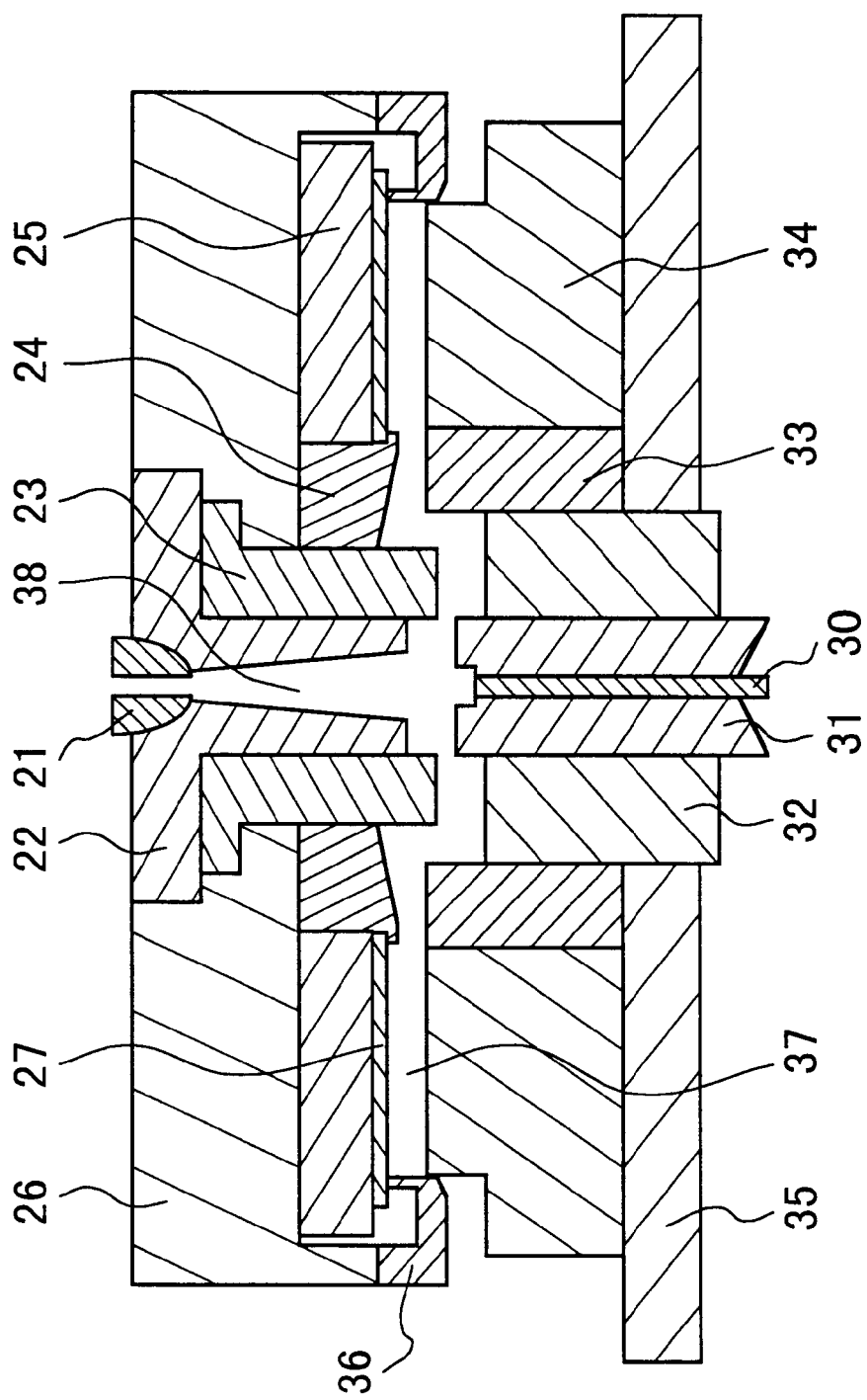
FIG. 2 is a sectional view showing a main part of a mold for manufacturing a substrate for the optical disk shown in FIG. 1.
Figure 3:
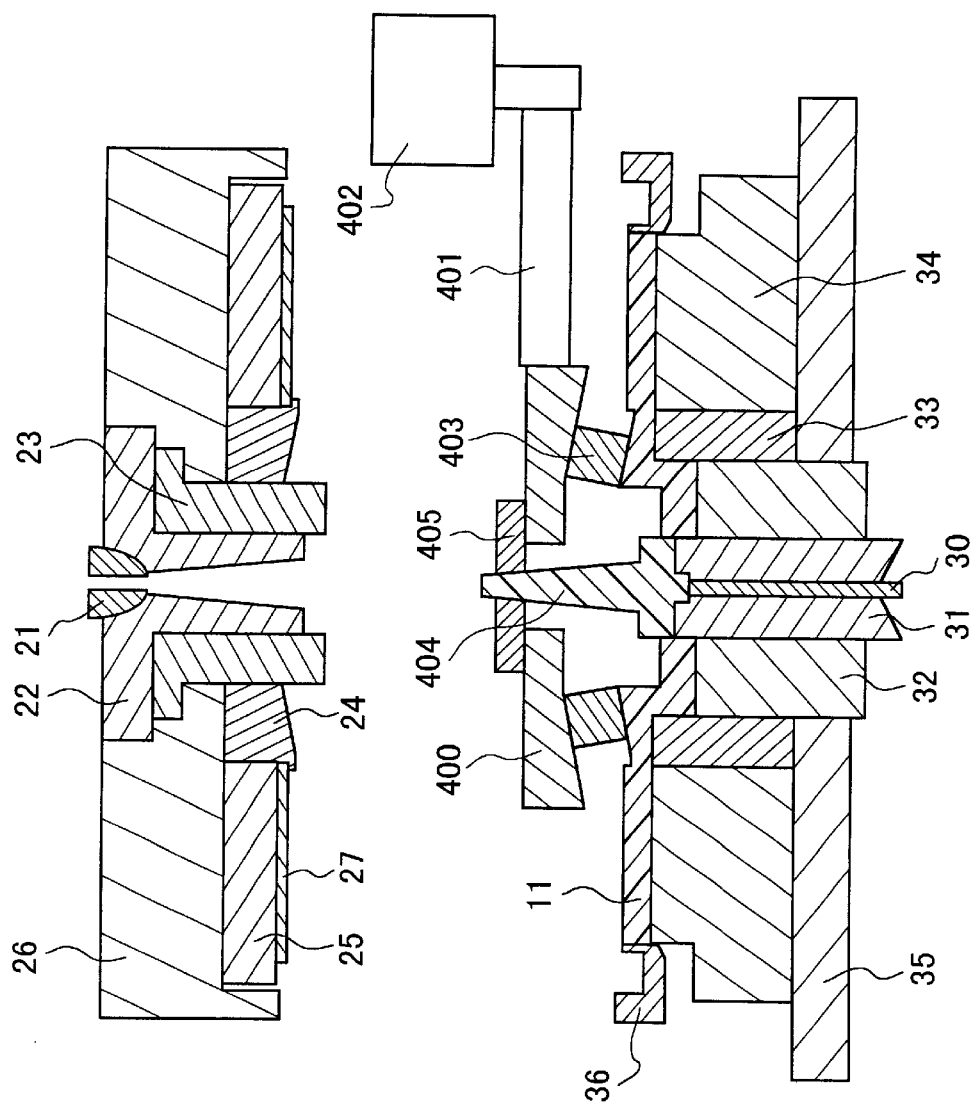
FIG. 3 is a sectional view of the main part showing a state where the mold is opened after a substrate is molded using the mold shown in FIG. 2.

Next, a method of manufacturing the substrate 11 is described. FIG. 2 is a sectional view showing a main part of a mold for injection molding used in the manufacture of the substrate 11. FIG. 3 is a sectional view of the main part showing a state of the mold opened during injection molding.

In FIG. 2, numeral 21 indicates a nozzle of an injection molding machine (not shown in the figure) for injecting resin melted in a high temperature state, numeral 22 a sprue bushing into which the nozzle 21 is pressed, numeral 23 a fixed-side bushing positioned outside the outer circumference of the sprue bushing 22, numeral 24 an inner stamper hold positioned outside the fixed-side bushing 23, numeral 25 a fixed-side main body positioned outside the inner stamper hold 24, and numeral 26 a fixed-side base. The fixed-side bushing 23 and the sprue bushing 22 are held by a step portion of the fixed-side base 26 formed on its inner circumferential side. The inner stamper hold 24 and the fixed-side main body 25 are attached to one surface (the lower surface) of the fixed-side base 26. The fixed-side base 26 is connected to a fixed-side platen (not shown in the figure) of the injection molding machine by its other surface (the upper surface). Numeral 27 indicates a stamper at one principal plane of which grooves or pits are carved. Its inner circumferential side end is caught by a pawl of the inner stamper hold 24 and thus the stamper is fixed and held with its surface opposite to the principal plane being in contact with the fixed-side main body 25.

Numeral 31 indicates a sprue cutting punch installed in a position opposing the sprue bushing 22, numeral 30 an injector located inside the sprue cutting punch 31, numeral 32 a floating punch installed outside the sprue cutting punch 31, numeral 33 a movable-side bushing located outside the floating punch 32, numeral 34 a movable-side main body positioned outside the movable-side bushing 33, and numeral 35 a movable-side base. The movable-side bushing 33 and the movable-side main body 34 are supported by one surface (the upper surface) of the movable-side base 35. The movable-side base 35 is connected to a movable-side platen (not shown in the figure) of the injection molding machine by its other surface (the lower surface).

Numeral 36 indicates a cavity ring positioned at the outer circumferential end of the movable-side main body 34, and numeral 37 is a cavity as a space surrounded by the fixed-side bushing 23, the inner stamper hold 24, the stamper 27, the cavity ring 36, the movable-side main body 34, the movable-side bushing 33, the floating punch 32, and the sprue cutting punch 31. Numeral 38 indicates a resin passage extending between the nozzle 21 and the cavity 37, which is defined by being surrounded by the sprue bushing 22 and the sprue cutting punch 31.

In FIG. 3, numeral 400 indicates an arm base and numeral 401 is a robot arm. Numeral 402 indicates a robot main body provided with a driving mechanism and a controller that are incorporated therein. The robot main body 402 supports the robot arm 401. Numeral 403 indicates a suction pad with a vacuum mechanism or the like, which is attached to the arm base 400. Numeral 404 indicates a sprue solidified in the resin passage 38 and numeral 405 a sprue chuck. Numeral 11 indicates a substrate that has been molded. The parts identical with those shown in FIG. 2 are indicated with the same numerals as those in FIG. 2.

A method of manufacturing the substrate 11 by the injection molding is described with reference to FIGS. 2 and 3 as follows.

Resin (for instance, polycarbonate) brought into a molten state by the injection molding machine is injected from the nozzle 21 into a mold clamped with about a few tons of force shown in FIG. 2, at a predetermined pressure and temperature. The resin passes through the resin passage 38 to be injected into the cavity 37 from the gap between the sprue cutting punch 31 and the fixed-side bushing 23. Thus, the cavity 37 is filled with the resin. After the filling, the sprue cutting punch 31 moves to the sprue bushing 22 side, and the sprue cutting punch 31 and the fixed-side bushing 22 function as a male blade and a female blade, respectively, to separate the resin passage 38 and the cavity 37.

After the pressure and temperature inside the cavity 37 are adjusted suitably and the resin inside the resin passage 38 and the cavity 37 is solidified to some degree, for example, air is blown between the stamper 27 and the resin inside the cavity 37 for the purpose of mold release and then the mold is opened. FIG. 3 shows the state where the mold has been opened. The resin (the substrate 11) inside the cavity 37 is in close contact with the movable-side main body 34 and the resin inside the resin passage 38 has been solidified and remains on the sprue cutting punch 31 as the sprue 404. In this state, the robot arm 401 for taking out the resin is inserted as shown in the figure.

The inner stamper hold 24 is installed with its surface on the cavity 37 side being inclined with respect to the principal plane of the stamper 27 at which the grooves or pits are carved. Therefore, the suction pad 403 also is placed while being inclined according to the inclination of the surface of the inner stamper hold 24 on the cavity 37 side. The substrate 11 is held by the suction pad 403 through depressurization. The sprue chuck 405 holds the sprue 404. The injector 30 is extended toward the sprue bushing 22 at the same time the air is blown between the substrate 11 and the movable-side main body 34, and the robot arm 401 is moved slightly to the fixed-side main body 25 side. Thus the substrate 11 and the sprue 404 are released from the mold. Next, the robot arm 401 is allowed to swing considerably in a horizontal plane and then the substrate 11 and the sprue 404 are taken out from the inside of the mold. Thus, the substrate 11 is taken out.

Afterward, as described above, a signal recording/reproduction layer or the reflection film is formed on the information surface 13 of the substrate 11 to form the information recording layer 18, and then the protective coating 19 is formed.

Figure 4:
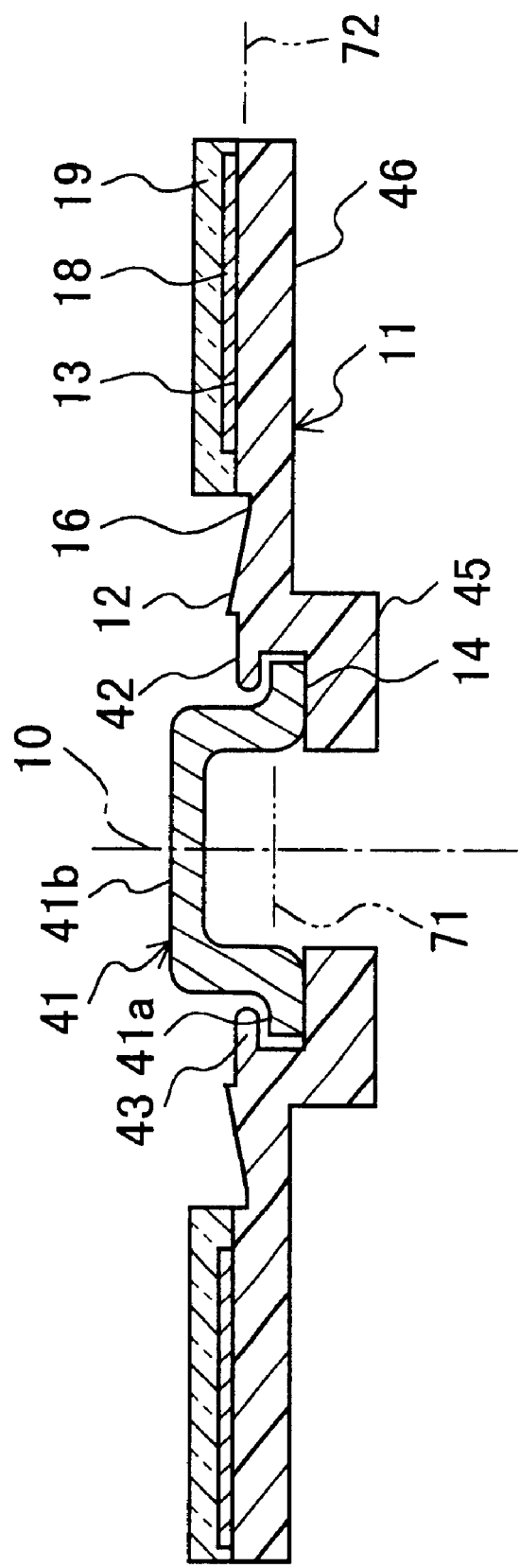
FIG. 4 is a schematic sectional view of an optical disk according to the first embodiment of the present invention.

FIG. 4 is a sectional view of the optical disk according to the first embodiment of the present invention, taken in a plane including the rotation central axis and in the thickness direction. In FIG. 4, numeral 41 indicates a clamp plate, numeral 41a an outer circumferential side flat portion (hereinafter referred to as an "outer flat portion") of the clamp plate 41, numeral 42 a displaced surface, and numeral 43 a projection part. In addition, numeral 11 indicates a substrate, numeral 12 a handling surface, numeral 13 an information surface, numeral 14 a clamp plate retaining surface, numeral 16 a recessed portion, numeral 18 an information recording layer, and numeral 19 a protective coating, which have the same functions as those of the respective identical parts shown in FIG. 1.

The clamp plate 41 is a disc-like plate formed of a material such as an iron plate or magnetic stainless steel and is attached onto the clamp plate retaining surface 14 of the substrate 11. A magnet is attached to a disk table fixed to the end of a spindle axis of a recording/reproducing device. The clamp plate 41 is placed on the disk table, so that the clamp plate 41 is attracted magnetically to the magnet. As a result, the substrate 11 is rotated together with the disk table. A pole for positioning a disk and a magnetic device for magnetic attraction are attached to the center portion of the disk table while being projected from the disk table. Therefore, the clamp plate 41 is formed with its center portion being projected in one direction to have a shape like a derby hat. Such a shape is produced using a pressing step in a sheet metal processing or the like.

Next, a step of placing the clamp plate 41 is described with reference to FIGS. 1 and 4. Initially, the clamp plate 41 is placed on the clamp plate retaining surface 14 shown in FIG. 1 so that the outer flat portion 41a corresponding to the brim of the derby hat comes into contact with the clamp plate retaining surface 14. Then, a ring-like contact face of a horn tip of an ultrasonic transducer (not shown in the figure) that vibrates at an appropriate vibration amplitude and frequency and in an appropriate vibration direction is pressed against the inner circumferential side end portion of the handling surface 12 with an appropriate pressing force. The resin forming the portion against which the contact face is pressed is melted by frictional heat generated by ultrasonic vibration to be deformed. According to this operation, as shown in FIG. 4, the portion of the handling surface 12 against which the ultrasonic horn has been pressed is deformed and thus the displaced surface 42 is formed. At the same time, the melted resin moves toward the rotation central axis 10 and thus a projection part 43 is formed. The clamp plate 41 is retained by the substrate 11 while being controlled in position in its thickness direction by the projection part 43 and the clamp plate retaining surface 14. With consideration to the difference in thermal expansion coefficient between the clamp plate 41 and the substrate 11, predetermined gaps are provided therebetween in the radial and thickness directions.

In order to reduce the thickness of the optical disk, it is necessary to shorten the distance in the thickness direction between the back face (a first lower face 45) of the clamp plate retaining surface 14 and the upper face of the protective coating 19. In addition, when the diameter of the optical disk is intended to be reduced, it is required to shorten the distance between the inner circumferential side end of the information surface 13 and the rotation central axis 10. Since the protective coating 19 has a thickness of no more than about 0.05 mm, it hardly has a margin for contributing to the reduction in thickness of the optical disk. Substantially, therefore, it is necessary to shorten the distance in the thickness direction between the first lower face 45 and the information surface 13. Preferably, in order to form a thin optical disk, the distance in the thickness direction between supposed first and second center planes 71 and 72 does not exceed 0.3 mm. The supposed first center plane 71 is at equal distances from the uppermost face 41b of the clamp plate 41 and the first lower face 45. The supposed second center plane 72 is at equal distances from the information surface 13 and the back face (a second lower face 46) of the substrate 11 in the area where the information surface 13 is formed.

Generally, the inner diameter of the optical disk substrate 11 corresponding to the diameter of a circle defined by the inner circumferential side end of the clamp plate retaining surface 14 is determined depending on a motor provided in a recording/reproducing device, the sizes of a positioning member of the disk table and a magnet device, or the like. Usually, the radial width of the clamp plate retaining surface 14 is determined depending on the shape and size of the clamp plate 41. The size of the handling surface 12 is limited by the size and positioning of the suction pad 403 and is determined with consideration to the weight of the substrate and the acceleration during handling. In the first embodiment of the present invention, it is preferable that the handling surface 12 has a radial width of 1.8 mm to 2.5 mm. The radial distance between the outer circumferential side end of the recessed portion 16 (corresponding to the outer circumferential side end of the handling surface 12) and the inner circumferential side end of the information surface 13 is determined depending on, for example, the margins in manufacture of the signal recording/reproduction film and the reflection film or the margin in manufacture of the protective coating 19. In the first embodiment of the present invention, it is preferable that the radial distance between the outer circumferential side end of the recessed portion 16 and the inner circumferential side end of the information surface 13 is 2.0 mm to 4.0 mm. In the first embodiment of the present invention, it is preferable that the radial distance from the inner circumferential side end to the outer circumferential side end of the information surface 13 is in the range of 12 to 14 mm. In addition, preferably, the radial distance from the outer circumferential side end of the information surface 13 to the outer circumferential side end of the substrate 11 is in the range of 1.0 to 3.0 mm. In the present invention, the "inner (outer) circumferential side end" of the information surface 13 denotes the inner (outer) circumferential side end in the radial direction of an area on the principal plane of the substrate 11 at which grooves or pits are formed.

The recessed portion 16 formed in the outer circumferential side end of the handling surface 12 reflects the shape of the pawl (a catching portion) for holding the stamper 27 by the inner stamper hold 24 of the mold. When it is intended to increase the strength with which the inner stamper hold 24 maintains the stamper 27, the recessed portion 16 is deepened. In order to secure the mechanical strength of the substrate 11, however, it is desirable that the recessed portion 16 be shallow. In the first embodiment of the present invention, therefore, it is preferable that the depth (the difference in level with respect to the information surface 13) of the recessed portion 16 does not exceed 0.25 mm.

In order to reduce the size and thickness of the optical disk substrate under the various limitations described above, in the present embodiment, the handling surface 12 is inclined with respect to the information surface 13 so that its inner circumferential side end is positioned at a higher level as shown in FIG. 1. Its outer circumferential side end is allowed to correspond to the recessed portion 16.

Figure 13:
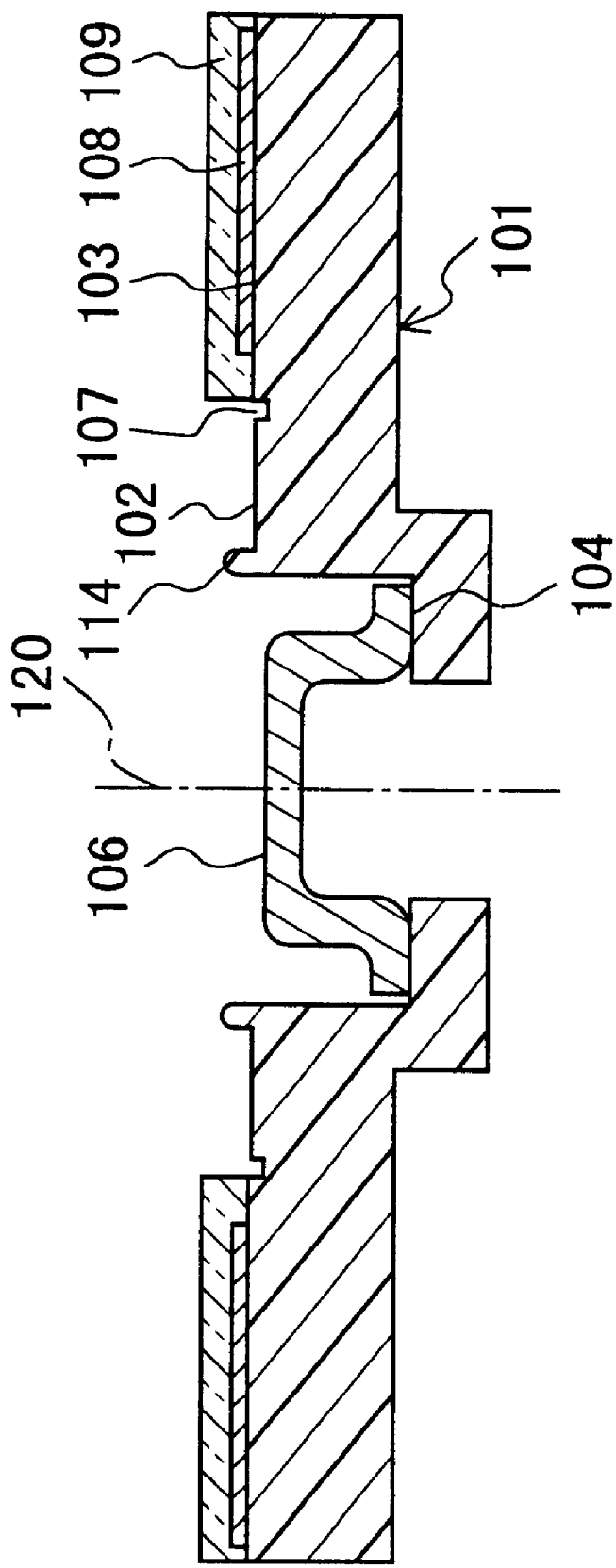
FIG. 13 is a schematic sectional view illustrating another method of attaching a clamp plate in the conventional optical disk.

Since the handling surface 12 is inclined so that its inner circumferential side end is positioned at a higher level, it is possible to form the projection part 43 with a sufficient projection amount for retaining the clamp plate 41 when the displaced surface 42 is formed for retaining the clamp plate 41 as shown in FIG. 4. Consequently, it is no longer necessary to form the protrusion 114 as shown in FIG. 13 at the inner circumferential side end of the handling surface 12. As a result, it is no longer necessary to shift the outer circumferential side end of the handling surface 12 radially outward. Therefore, the radial distance between the outer circumferential side end of the clamp plate retaining surface 14 and the inner circumferential side end of the information surface 13 can be shortened. Thus, the diameter of the optical disk can be reduced.

Furthermore, since the projection part 43 with a sufficient projection amount can be formed, the thickness of the substrate 11 in the area where the information surface 13 is formed can be reduced.

Moreover, the outer circumferential side end of the handling surface 12 is formed to be deepest in the handling surface and the recessed portion 16 part of which is shared with the handling surface 12 is provided in the deepest portion. Therefore, it is possible to secure the strength of the pawl of the inner stamper hold 24 for holding the stamper 27.

Thus, an optical disk that can achieve the size and thickness reduction and a substrate for the disk can be provided.

In the above, it is preferable that the inclination angle θ of the handling surface 12 with respect to the information surface 13 in the sectional view taken in a plane including the rotation center axis of the optical disk is 2° to 10°, and further preferably 3° to 6°.

Figure 5A:
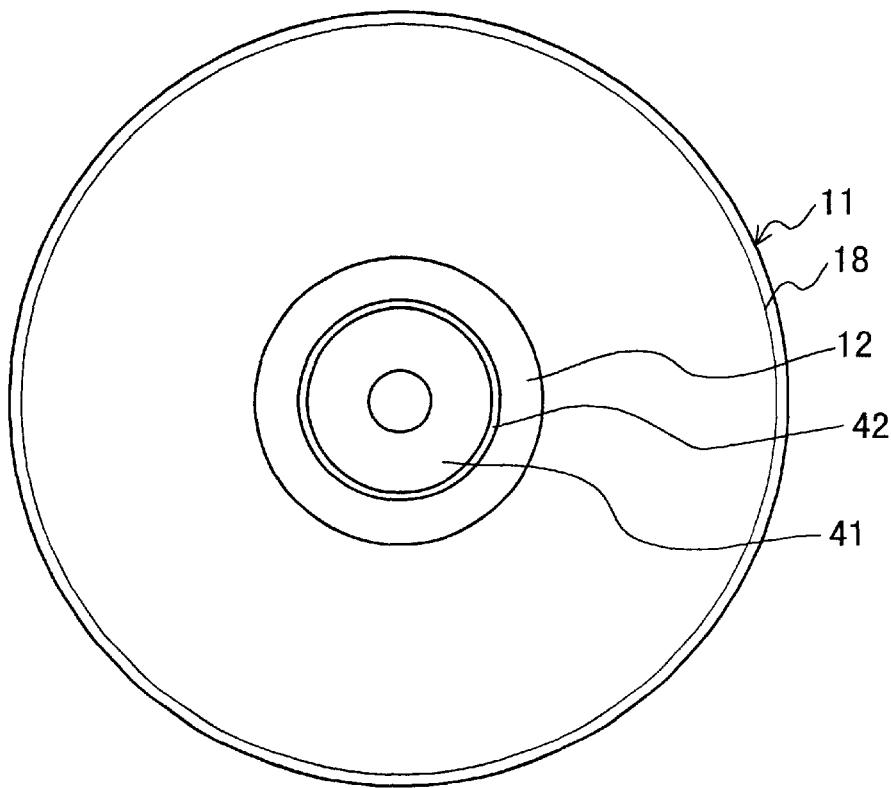
FIGS. 5A and 5B show an optical disk according to an example of the first embodiment of the present invention.
Figure 5B:
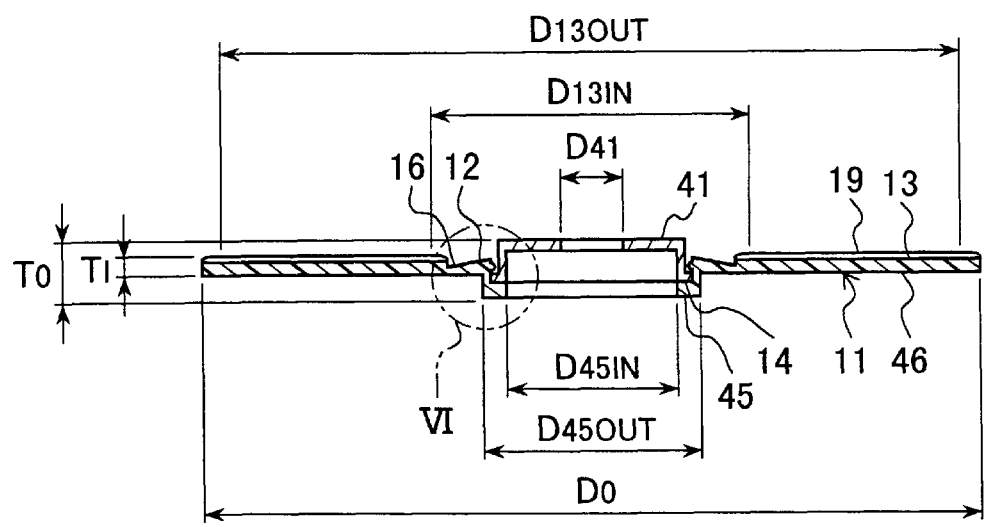
Figure 6:
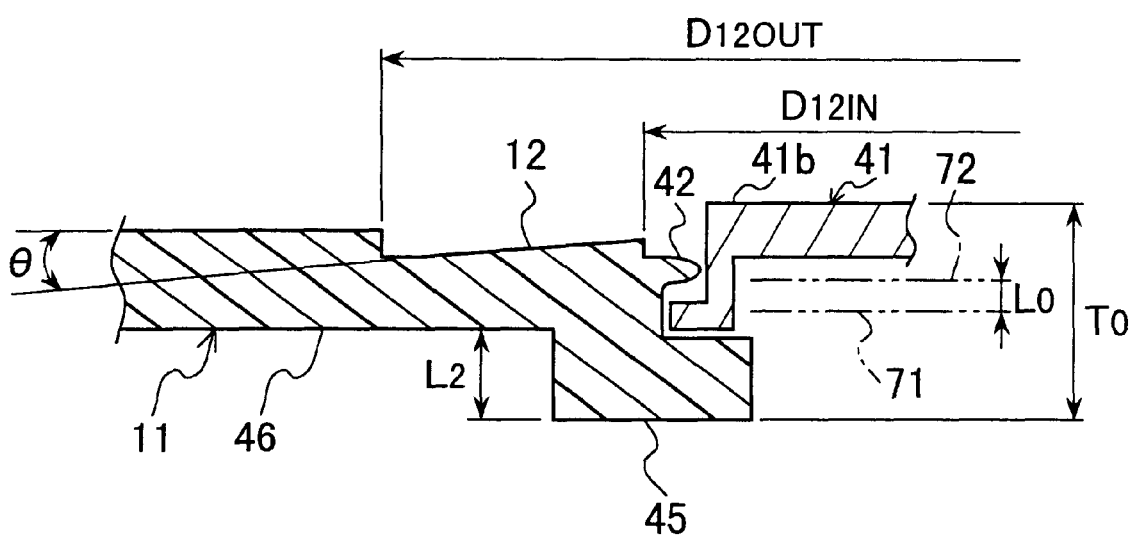
FIG. 6 is an enlarged sectional view of a portion VI shown in FIG. 5B.

FIGS. 5A, 5B, and 6 show a specific example of an optical disk. FIG. 5A is a plan view of the optical disk, FIG. 5B a sectional view thereof, and FIG. 6 an enlarged sectional view of the portion VI shown in FIG. 5B. In FIGS. 5A, 5B, and 6, the optical disk outer diameter DO is 50.8 mm, the diameter D45OUT of a circle defined by the outer circumferential side end (hereinafter referred to as an "outer circumferential side end diameter") of the first lower face 45 is 14.5 mm, the diameter D45IN of a circle defined by the inner circumferential side end (hereinafter referred to as an "inner circumferential side end diameter") of the first lower face 45 is 11 mm, the outer circumferential side end diameter D13OUT of the information surface 13 is 47.6 mm, the inner circumferential side end diameter D13IN of the information surface 13 is 22 mm, the outer circumferential side end diameter D12OUT of the handling surface 12 is 18 mm, the inner circumferential side end diameter D12IN of the handling surface 12 is 13.3 mm, and the opening diameter D41 at the center of the clamp plate 41 is 4 mm. The distance T0 between the uppermost face 41b of the clamp plate 41 and the first lower face 45 is 1.8 mm, the distance T1 between the surface of the protective coating 19 and the second lower face 46 is 0.6 mm, the distance L0 between the supposed first center plane 71 and the supposed second center plane 72 is 0.1 mm, the difference in level L2 in the thickness direction between the first lower face 45 and the second lower face 46 is 0.7 mm, and the inclination angle θ of the handling surface 12 with respect to the information surface 13 is 5.6 degrees.

The above description was directed to an example in which the stamper 27 is mounted on the fixed-side platen side. However, the present invention also is practicable when the stamper is mounted on the movable-side platen side.

Figure 7:
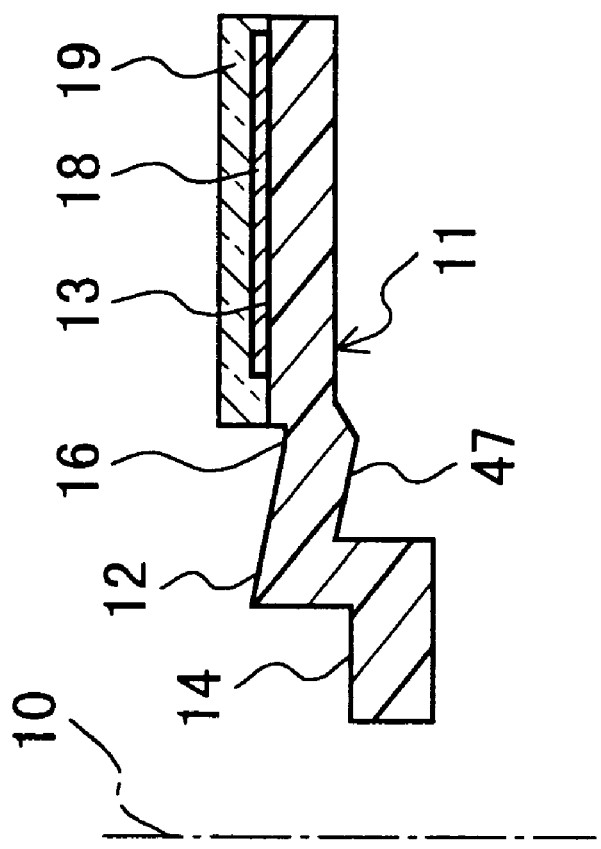
FIG. 7 is a schematic sectional view of another optical disk according to the first embodiment of the present invention.
Figure 8:
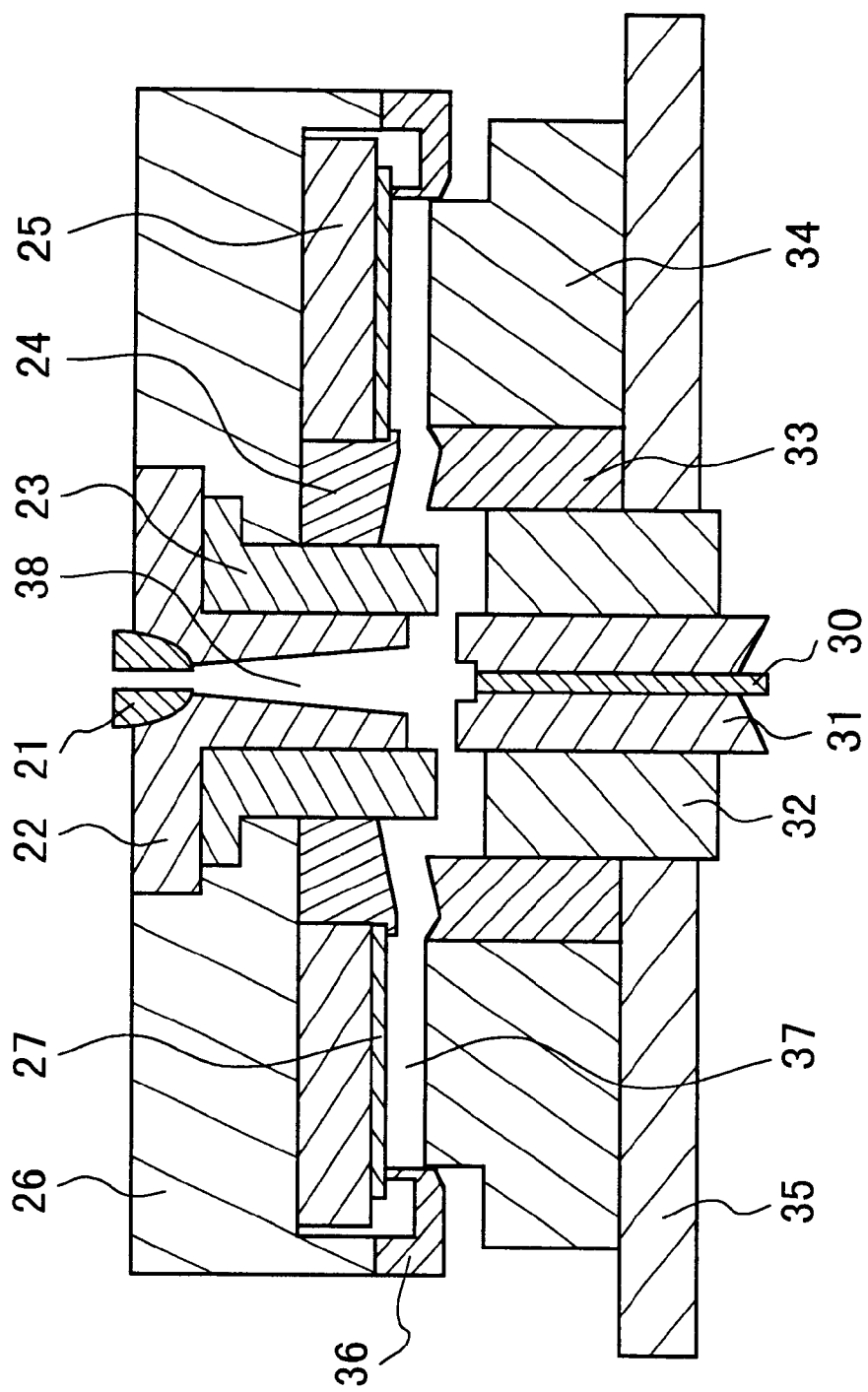
FIG. 8 is a sectional view of a main part of a mold for manufacturing a substrate for the optical disk shown in FIG. 7.

Furthermore, as shown in FIG. 7, the surface 47 opposing the handling surface 12 may be inclined corresponding to the inclination of the handling surface 12. As shown in FIG. 8, the surface of the movable-side bushing 33 on the cavity 37 side may be inclined corresponding to the inclination of the surface of the inner stamper hold 24 on the cavity 37 side. Similarly in such cases, the same effects as in the above can be expected.

Second Embodiment

Figure 9:
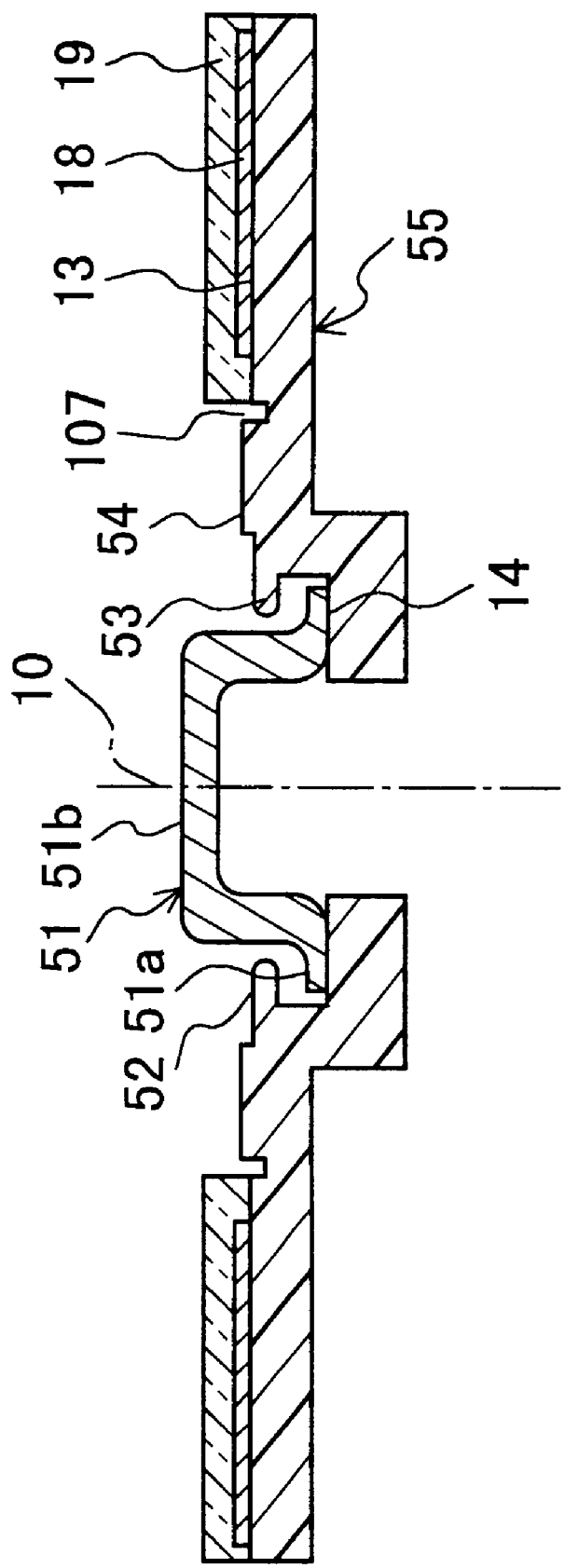
FIG. 9 is a schematic sectional view of an optical disk according to a second embodiment of the present invention.

FIG. 9 is a sectional view of an optical disk according to a second embodiment of the present invention, taken in a plane including the rotation central axis and in the thickness direction. In FIG. 9, numeral 51 indicates a clamp plate, numeral 52 a displaced surface, numeral 53 a projection part, numeral 54 a handling surface substantially parallel to the information surface 13, and numeral 55 a substrate. In addition, numeral 14 indicates a clamp plate retaining surface, numeral 18 an information recording layer, and numeral 19 a protective coating, which have the same functions as those of the respective identical parts described in the first embodiment.

The process of molding the substrate 55 by injection molding is identical with that in the first embodiment although the shape of the substrate is slightly different from that in the first embodiment.

The clamp plate 51 has the same shape of a derby hat as that of the clamp plate 41 described in the first embodiment. However, the clamp plate 51 is different from the clamp plate 41 of the first embodiment in that the outer flat portion 51a corresponding to the brim of the derby hat is thinner than the portion of the uppermost face 51b (an inner circumferential side flat portion (hereinafter referred to as an "inner flat portion")). Preferably, the thickness of the outer flat portion 51a is one fifth to four fifths the thickness of the inner flat portion. Specifically, it is preferable that the inner flat portion has a thickness of 0.2 to 0.5 mm, particularly 0.3 mm, and the outer flat portion 51a has a thickness of 0.1 to 0.15 mm. Such a clamp plate 51 can be produced using a multi-stage drawing step in sheet metal processing.

Such a clamp plate 51 is attached to the substrate 55 as in the first embodiment. More particularly, initially, the clamp plate 51 is placed on the clamp plate retaining surface 14 with its outer flat portion 51a being in contact with the clamp plate retaining surface 14. Next, a ring-like contact face of a horn tip of an ultrasonic transducer is pressed against the inner circumferential side end portion of the handling surface 54. The resin forming the portion (hereinafter referred to as the "pressed portion") against which the contact face is pressed is melted by frictional heat generated by ultrasonic vibration to be deformed. As a result, as shown in FIG. 9, the pressed portion is deformed and thus the displaced surface 52 is formed. At the same time, the melted resin moves toward the rotation central axis 10 and thus a projection part 53 is formed.

The following description is directed to the functions of the optical disk and the substrate configured as described above.

The clamp plate 51 is a member required for the optical disk to be attracted and held to the disk table of a recording/reproducing device with a magnetic force. In order to obtain a magnetic force (a clamping force) equal to or higher than a predetermined magnetic force, the inner flat portion of the clamp plate 51 to be magnetically attracted is required to have at least a certain thickness. Suppose the thickness of the outer flat portion 51a of the clamp plate 51 not subjected to magnetic attraction is increased to be equal to that of the inner flat portion. In this case, it is necessary to increase the space between the clamp plate retaining surface 14 and the projection part 53 accordingly. On the other hand, in order to form the projection part 53 with a projection amount required for the clamp plate 51 to be retained, there is a lower limit in the amount of difference in level between the displaced surface 53 and the handling surface 54. Therefore, it is necessary to provide a sufficient distance between the clamp plate retaining surface 14 and the handling surface 54. Consequently, the thickness of the substrate 55 cannot be reduced.

With the foregoing in mind, in the present embodiment, the outer flat portion 51a of the clamp plate 51 is set to be thinner than the inner flat portion. As a result, the space between the clamp plate retaining surface 14 and the projection part 53 can be reduced even when the gaps are provided with consideration to the difference in thermal expansion. Therefore, while the projection part 53 with a projection amount required for the clamp plate 51 to be retained is formed, the distance between the clamp plate retaining surface 14 and the handling surface 54 can be reduced. Thus, the thicknesses of the substrate 55 and the optical disk can be reduced.

Thus, the handling surface 54 of the present embodiment is not inclined with respect to the information surface 13, which is different from the handling surface 12 of the first embodiment. However, it also is possible to apply the clamp plate 51 of the present embodiment to the substrate 11 provided with the inclined handling surface 12 described in the first embodiment.

The above description was directed to an example in which the clamp plate 51 is produced in a multi-stage drawing pressing step. However, the method of manufacturing the clamp plate 51 is not limited thereto. For instance, a plurality of members may be stacked by welding or the like, so that a relatively thick inner flat portion also can be obtained.

Third Embodiment

Figure 10:
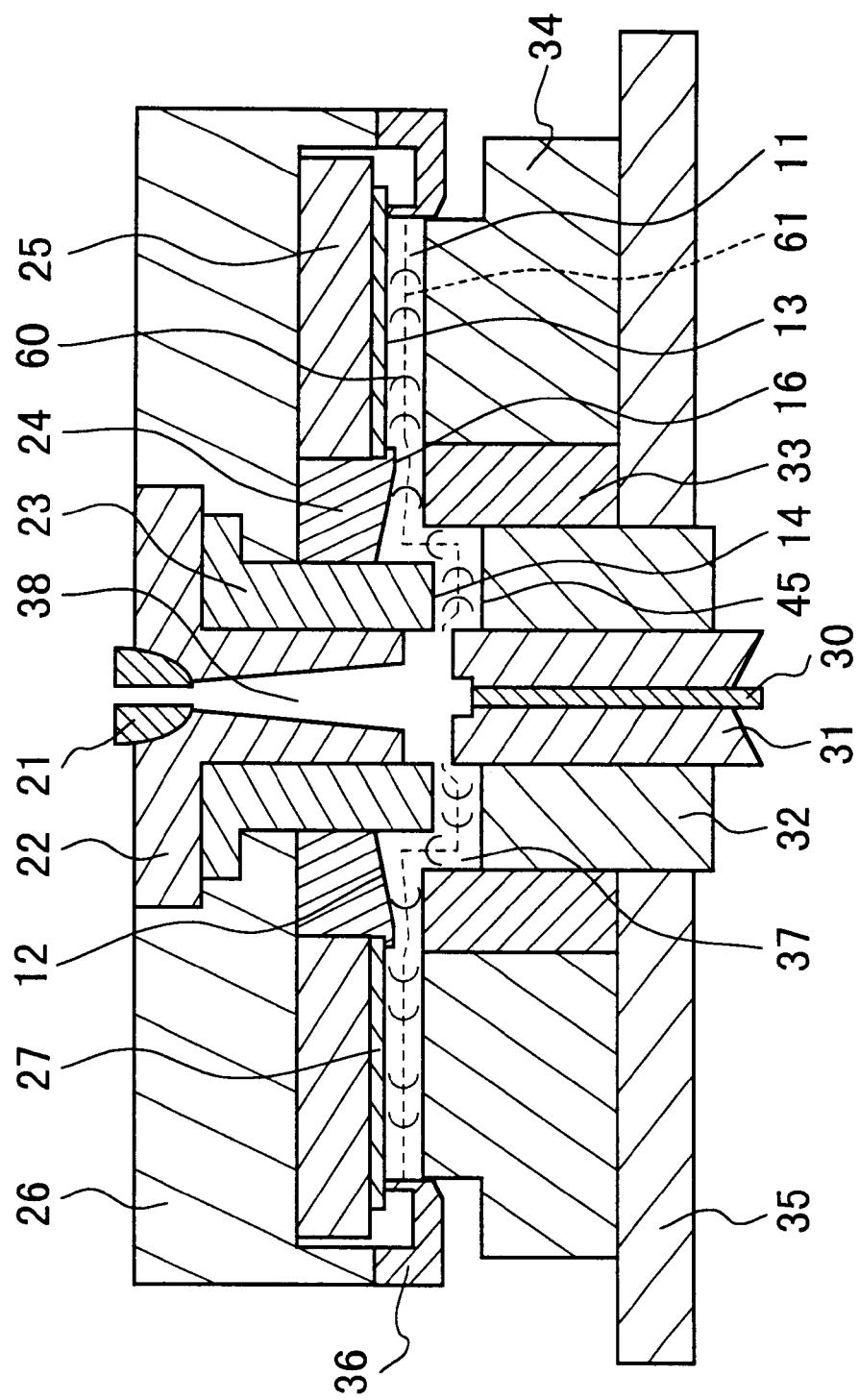
FIG. 10 is a sectional view of a main part of a mold for manufacturing a substrate for an optical disk according to a third embodiment of the present invention.
Figure 11:
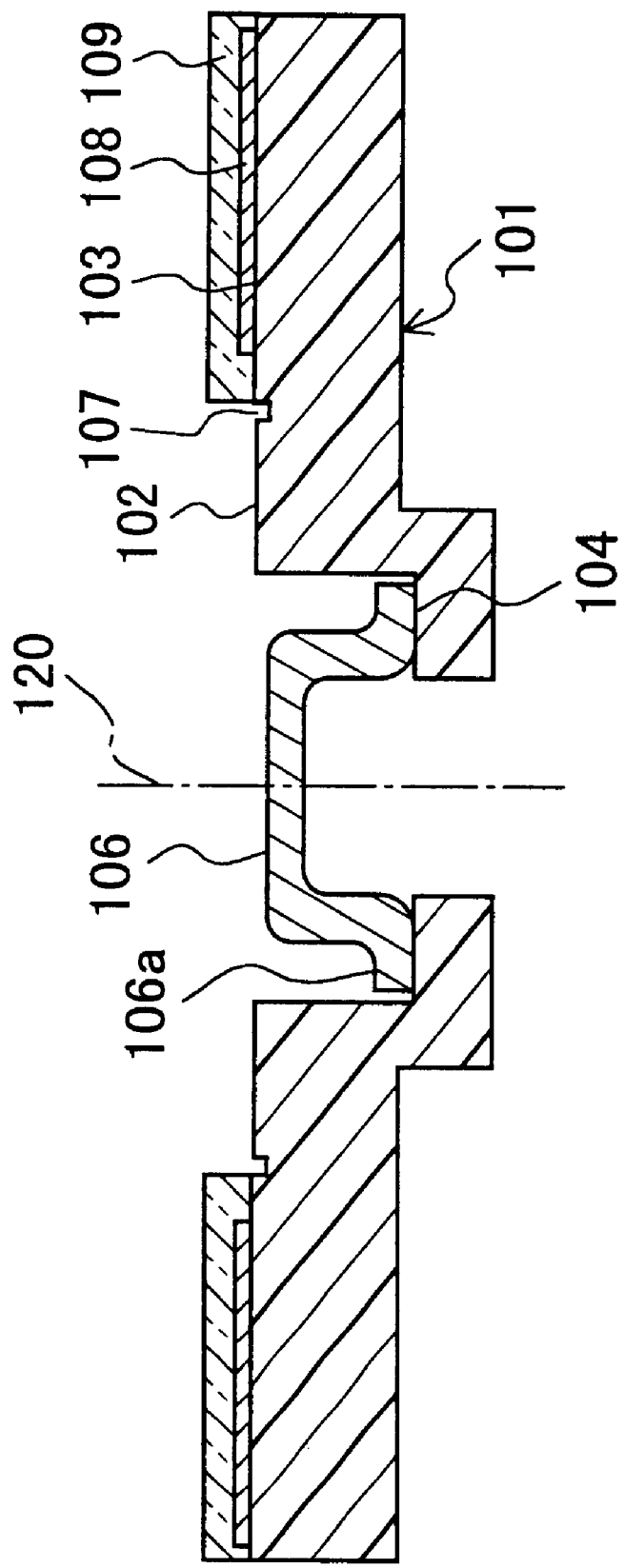
FIG. 11 is a schematic sectional view of a conventional optical disk.
Figure 12:
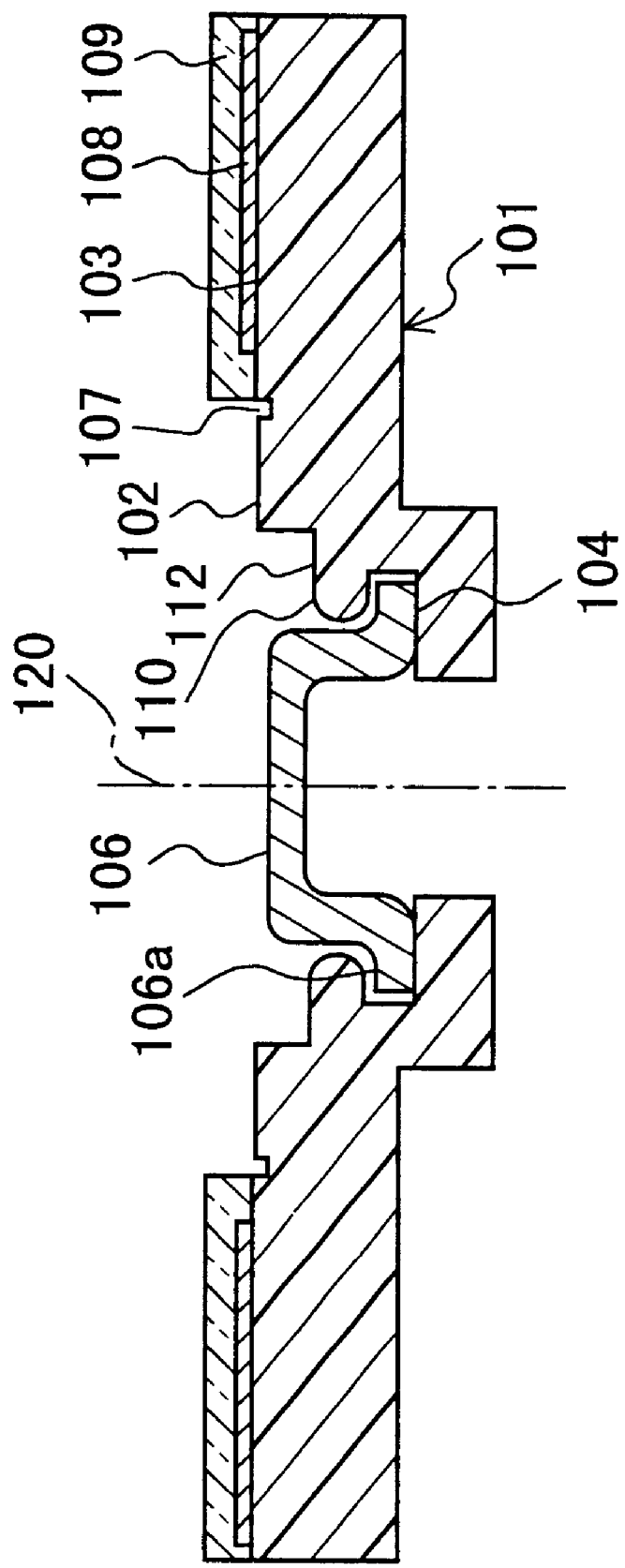
FIG. 12 is a schematic sectional view illustrating a method of attaching a clamp plate in the conventional optical disk.

FIG. 10 is a sectional view showing a main part of a mold for injection molding used in manufacturing an optical disk substrate according to a third embodiment of the present invention. FIG. 10 also shows the manner of the flow of resin injected into a cavity 37. In FIG. 10, the solid line 60 indicates the manner of the filling and flow of the resin and the broken line 61 indicates a line along the vicinity of the center of the resin flow. Numeral 11 indicates a substrate, numeral 12 a handling surface, numeral 13 an information surface, numeral 14 a clamp plate retaining surface, and numeral 16 a recessed portion, which have the same functions as those of the respective identical parts shown in FIG. 1. In addition, numeral 21 indicates a nozzle, numeral 22 a sprue bushing, numeral 23 a fixed-side bushing, numeral 24 an inner stamper hold, numeral 25 a fixedside main body, numeral 26 a fixed-side base, numeral 27 a stamper, numeral 30 an ejector, numeral 32 a floating punch, numeral 33 a movableside bushing, numeral 34 a movable-side main body, numeral 35 a movableside base, numeral 36 a cavity ring, numeral 37 a cavity, and numeral 38 a resin passage, which have the same functions as those of the respective identical parts and portions shown in FIG. 2.

Resin (for instance, polycarbonate) brought into a molten state by the injection molding machine is injected at a predetermined pressure and temperature from the nozzle 21 into a mold clamped with about a few tons of force shown in FIG. 10 and passes through the resin passage 38 to be injected into the cavity 37 from the gap between the sprue cutting punch 31 and the fixed-side bushing 23. Thus, the cavity 37 is filled with the resin. In this stage, the cavity is filled with the resin gradually from the resin passage 38 at the center toward the outer circumference as indicated with a the solid line 60. In concert with this, the resin is cooled and solidified gradually from its portion in the vicinity of the mold surface. Therefore, the gap through which the resin can flow is reduced gradually to be present in the vicinity of the broken line 61. In an initial step of the filling, the resin in the vicinity of the surface of the fixed-side bushing 23 and the resin in the vicinity of the surface of the floating punch 32, which are positioned near the resin passage 38, are cooled and solidified gradually. The same cooling and solidification are developed toward the outer circumference of the cavity 37 gradually.

When attention is paid to the front end face of the resin with which the cavity 37 is to be filled, in its flowing direction, as the resin filling progresses, the distance from the resin passage 38 to the front end face gradually increases and therefore, the whole area of the annular front end face gradually increases. In this stage, it is important that the rate of increase in the whole area of the front end face does not vary considerably from the start to the end of the filling. A considerable variation in the rate of increase denotes that the rate of resin filling varies considerably depending on the position. In this case, unevenness occurs in the cooling process and thus mechanical and optical distortions remain in the substrate 11 eventually obtained. The rate of increase that does not vary and is constant denotes that the gap between opposed walls defining the cavity 37 in the sectional view shown in FIG. 10 hardly is changed in the resin flowing direction.

From such a viewpoint, the present inventors studied a number of shapes of the cavity 37. As a result, they found that the unevenness in the cooling process was reduced to an ignorable level and thus a substrate was obtained in which the mechanical and optical distortions hardly remained, when the gap between opposed wall surfaces in respective places where the resin flowed was in the range of 0.7 to 1.25 times the gap between the surface of the stamper 27 for forming the information surface 13 and the surface of the movable-side main body 34 opposing thereto.

In other words, with respect to the substrates 11 shown in FIGS. 1 and 4 obtained eventually, it is preferable that the following conditions are satisfied. First, it is preferable that the thickness (the distance between the clamp plate retaining surface 14 and the first lower face 45) of the substrate 11 in the area where the clamp plate retaining surface 14 is formed is in the range of 0.75 to 1.25 times the thickness (the distance between the information surface 13 and the second lower face 46) of the substrate 11 in the area where the information surface 13 is formed. Second, preferably, the thickness (the distance between the handling surface 12 and the second lower face 46) of the substrate 11 in the area where the handling surface 12 is formed is in the range of 0.75 to 1.25 times the thickness of the substrate 11 in the area where the information surface 13 is formed. Third, it is preferable that the distance between a cylindrical surface extending between the clamp plate retaining surface 14 and the handling surface 12 and a cylindrical surface extending between the back face (the first lower face 45) of the clamp plate retaining surface 14 and the back face (the second lower face 46) of the information surface 13 is in the range of 0.75 to 1.25 times the thickness of the substrate 11 in the area where the information surface 13 is formed.

In the above, the description was directed to an example of a mold for molding the substrate 11 with the handling surface 12 inclined with respect to the information surface 13, which is described in the first embodiment. However, the design idea described above also can be applied to the mold for molding the substrate 55 with the handling surface 54 substantially parallel to the information surface 13, which is described in the second embodiment.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical disk substrate, comprising:
   a clamp plate with an outer circumferential side flat portion;
   a clamp plate retaining surface for retaining the clamp plate with the outer circumferential side flat portion being in contact therewith;
   a handling surface provided outside an outer circumference of the clamp plate retaining surface; and
   an information surface provided outside an outer circumference of the handling surface,
   wherein at least part of the handling surface is inclined with respect to the information surface.

2. The optical disk substrate according to claim 1, wherein the optical disk substrate has a thickness in a range of 0.5 mm to 0.7 mm in an area where the information surface is formed.

3. The optical disk substrate according to claim 1, wherein an inclination angle of the handling surface with respect to the information surface is in a range of 2° to 10°.

4. The optical disk substrate according to claim 1, wherein the handling surface has a radial width in a range of 1.8 mm to 2.5 mm.

5. The optical disk substrate according to claim 1, wherein a radial distance between an outer circumferential side end of the handling surface and an inner circumferential side end of the information surface is in a range of 2.0 to 4.0 mm.

6. The optical disk substrate according to claim 1, wherein a distance between a supposed first center plane and a supposed second center plane does not exceed 0.3 mm,
   where the supposed first center plane is at equal distances from a surface of the clamp plate furthest from the clamp plate retaining surface and a back face of the optical disk substrate in an area where the clamp plate retaining surface is formed, and
   the supposed second center plane is at equal distances from the information surface and a back face of the optical disk substrate in an area where the information surface is formed.

7. The optical disk substrate according to claim 1, wherein a distance between the information surface and a plane including a circle defined by a deepest portion of the handling surface does not exceed 0.25 mm.

8. The optical disk substrate according to claim 1, wherein an outer circumferential side end of the handling surface is lower than the information surface.

9. The optical disk substrate according to claim 1, further comprising a projection part projecting toward a center of the optical disk substrate, the projection part being formed inside an inner circumferential side end of the handling surface with an upper face of the projection part being lower than the inner circumferential side end of the handling surface, wherein the clamp plate is limited in position in its thickness direction by the projection part and the clamp plate retaining surface.

10. The optical disk substrate according to claim 1, wherein the outer circumferential side flat portion of the clamp plate is thinner than an inner circumferential side flat portion of the clamp plate.

11. The optical disk substrate according to claim 10, wherein the inner circumferential side flat portion of the clamp plate is formed of a plurality of stacked members.

12. An optical disk substrate, comprising:
a clamp plate with an outer circumferential side flat portion and an inner circumferential side flat portion;
a clamp plate retaining surface for retaining the clamp plate with the outer circumferential side flat portion being in contact therewith;
a handling surface provided outside an outer circumference of the clamp plate retaining surface; and
an information surface provided outside an outer circumference of the handling surface,
wherein the outer circumferential side flat portion of the clamp plate is thinner than the inner circumferential side flat portion of the clamp plate.

13. The optical disk substrate according to claim 12, wherein the inner circumferential side flat portion of the clamp plate is formed of a plurality of stacked members.

14. An optical disk substrate, comprising:
a clamp plate with an outer circumferential side flat portion and an inner circumferential side flat portion;
a clamp plate retaining surface for retaining the clamp plate with the outer circumferential side flat portion being in contact therewith;
a handling surface provided outside an outer circumference of the clamp plate retaining surface; and
an information surface provided outside an outer circumference of the handling surface,
wherein the clamp plate retaining surface and the information surface are different in level,
a thickness of the optical disk substrate in an area where the clamp plate retaining surface is formed is in a range of 0.75 to 1.25 times a thickness of the optical disk substrate in an area where the information surface is formed,
a thickness of the optical disk substrate in an area where the handling surface is formed is in a range of 0.75 to 1.25 times the thickness of the optical disk substrate in the area where the information surface is formed, and
a distance between a wall surface extending between the clamp plate retaining surface and the handling surface and a wall surface extending between a back face of the clamp plate retaining surface and a back face of the information surface is in a range of 0.75 to 1.25 times the thickness of the optical disk substrate in the area where the information surface is formed.

15. The optical disk substrate according to claim 14, wherein at least part of the handling surface is inclined with respect to the information surface.

16. An optical disk, comprising:
an optical disk substrate according to claim 1; and
an information recording layer,
wherein the information recording layer is formed on the information surface of the optical disk substrate.

17. The optical disk according to claim 16, further comprising grooves along recording tracks or grooves forming recording tracks at the information surface,
wherein a ratio of a quantity of light reflected from the grooves to a quantity of light reflected from a flat portion other than a portion where the grooves are formed is in a range 0.3 to 0.8 when the information recording layer is irradiated with a beam.

18. The optical disk according to claim 17, wherein the beam with which the information recording layer is irradiated has the same wavelength as that of a beam used for recording and/or reproduction.

19. A mold, comprising at least:
a disc-like fixed-side main body with a flat principal plane;
an inner stamper hold fitted inside the disc-like fixed-side main body;
a fixed-side bushing fitted inside the inner stamper hold;
a disc-like movable-side main body installed in a position substantially opposing the disc-like fixed-side main body at a predetermined space;
a movable-side bushing, which is fitted inside the disc-like movable-side main body and is installed in a position substantially opposing the inner stamper hold at a predetermined space; and
a floating punch, which is fitted inside the movable-side bushing and is installed in a position substantially opposing the fixed-side bushing at a predetermined space,
wherein a surface of the inner stamper hold opposing the movable-side bushing is inclined with respect to the principal plane of the disc-like fixed-side main body, and
a surface of the fixed-side bushing opposing the floating punch is positioned on a side of the floating punch with respect to the principal plane of the disc-like fixed-side main body.

20. The mold according to claim 19, wherein the surface of the inner stamper hold opposing the movable-side bushing has a slope inclined from its inner circumferential side to its outer circumferential side toward the movable-side bushing.

21. The mold according to claim 19, further comprising a disc-like stamper attached to the principal plane of the disc-like fixed-side main body,
wherein an outer circumferential side end of the surface of the inner stamper hold opposing the movable-side bushing is positioned on a side of the movable-side bushing with respect to a surface of the stamper, and
an inner circumferential side end of the surface of the inner stamper hold opposing the movable-side bushing is positioned further apart from the movable-side bushing than the outer circumferential side end is.

22. An optical disk, comprising:
an optical disk substrate according to claim 12; and
an information recording layer,
wherein the information recording layer is formed on the information surface of the optical disk substrate.

23. An optical disk, comprising:
an optical disk substrate according to claim 14; and
an information recording layer,
wherein the information recording layer is formed on the information surface of the optical disk substrate.

* * * * *